US008290650B2

(12) United States Patent
Watanabe

(10) Patent No.: US 8,290,650 B2
(45) Date of Patent: Oct. 16, 2012

(54) HYBRID VEHICLE, CONTROL METHOD FOR HYBRID VEHICLE AND COMPUTER-READABLE RECORDING MEDIUM TO RECORD PROGRAM FOR MAKING COMPUTER EXECUTE CONTROL METHOD

(75) Inventor: Takashi Watanabe, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 499 days.

(21) Appl. No.: 12/452,077

(22) PCT Filed: Jul. 17, 2008

(86) PCT No.: PCT/JP2008/063340
§ 371 (c)(1),
(2), (4) Date: Dec. 15, 2009

(87) PCT Pub. No.: WO2009/019991
PCT Pub. Date: Feb. 12, 2009

(65) Prior Publication Data
US 2010/0121510 A1 May 13, 2010

(30) Foreign Application Priority Data
Aug. 9, 2007 (JP) .................................. 2007-208146

(51) Int. Cl.
*B60L 11/00* (2006.01)
(52) U.S. Cl. .... 701/22; 701/99; 180/65.265; 180/65.28; 180/65.285
(58) Field of Classification Search .................... 701/22, 701/69, 99, 101, 102; 180/65.265, 65.21, 180/65.27, 65.275, 65.28, 65.285
See application file for complete search history.

(56) References Cited

U.S. PATENT DOCUMENTS

| 5,251,603 | A | * | 10/1993 | Watanabe et al. | ............. | 123/541 |
| 5,962,927 | A | | 10/1999 | Inada et al. | | |
| 6,109,244 | A | * | 8/2000 | Yamamoto et al. | ........... | 123/478 |
| 6,427,793 | B1 | | 8/2002 | Hanada et al. | | |
| 6,971,368 | B2 | * | 12/2005 | Uchiyama | ...................... | 123/359 |
| 8,096,376 | B2 | * | 1/2012 | Osawa | ........................ | 180/65.27 |
| 2005/0103312 | A1 | * | 5/2005 | Uchiyama | ...................... | 123/457 |

FOREIGN PATENT DOCUMENTS

| JP | A-5-270294 | 10/1993 |
| JP | A-9-184439 | 7/1997 |
| JP | A-9-184459 | 7/1997 |
| JP | A-10-339334 | 12/1998 |

(Continued)

OTHER PUBLICATIONS

European Search Report issued in European Patent Application No. 08 79 1590.6 dated Sep. 28, 2011.

(Continued)

*Primary Examiner* — Russell Frejd
(74) *Attorney, Agent, or Firm* — Oliff & Berridge, PLC

(57) ABSTRACT

A temperature sensor detects a temperature of a fuel pipe for supplying fuel from a fuel tank to an engine. A HV-ECU controls switching of a traveling mode including an EV mode for traveling while stopping engine and a HV mode for traveling while operating engine. HV-ECU receives a detected value of temperature from an engine ECU and switches the traveling mode from the EV mode to the HV mode when temperature of fuel pipe is increased to not less than a prescribed threshold value at the time of traveling in the EV mode.

10 Claims, 10 Drawing Sheets

FOREIGN PATENT DOCUMENTS

| | | |
|---|---|---|
| JP | A-2000-161099 | 6/2000 |
| JP | A-2001-115869 | 4/2001 |
| JP | A-2005-146910 | 6/2005 |
| JP | A-2005-180222 | 7/2005 |

OTHER PUBLICATIONS

International Search Report issued in International Application No. PCT/JP2008/063340; Mailed Nov. 11, 2008.

* cited by examiner

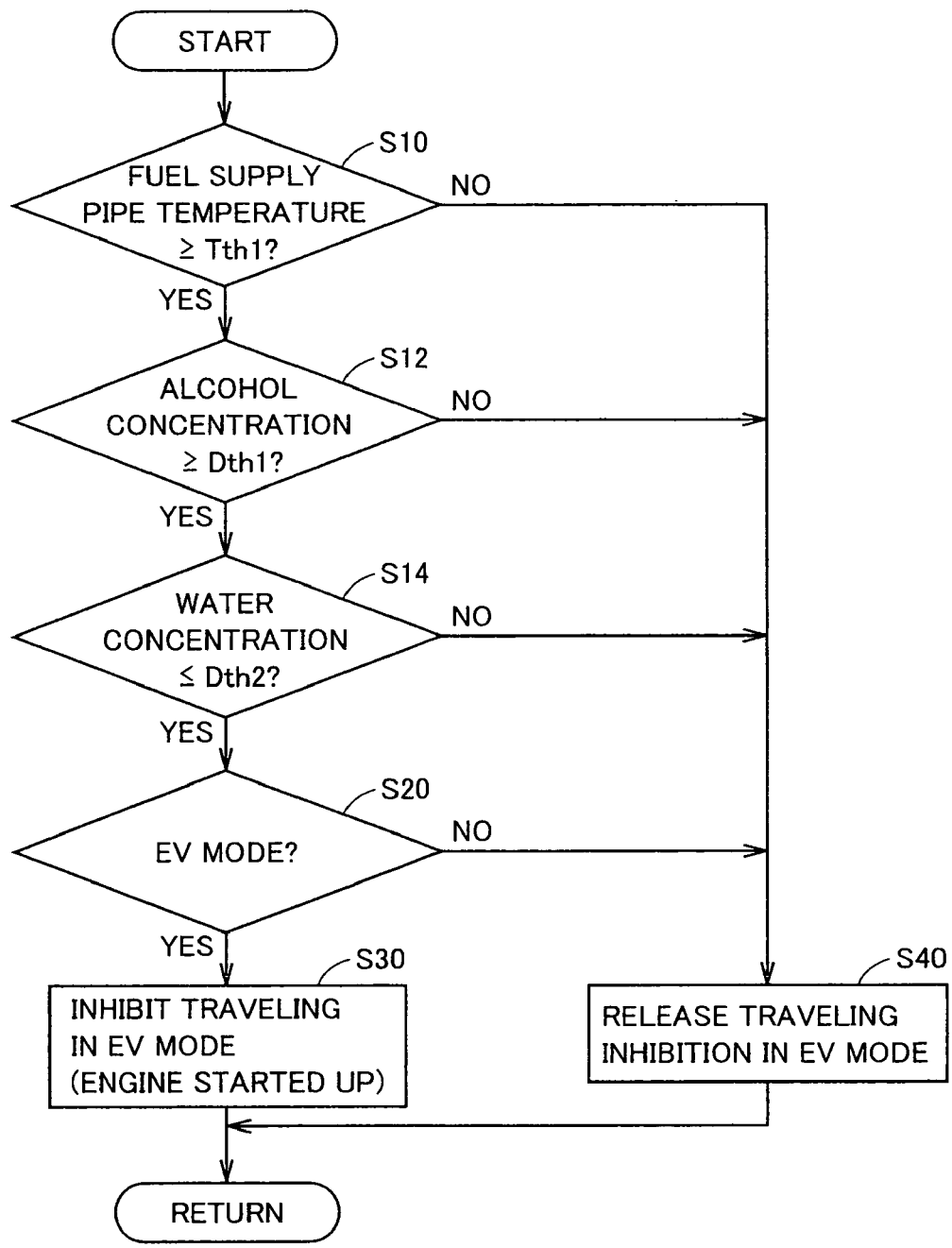

HYBRID VEHICLE, CONTROL METHOD FOR HYBRID VEHICLE AND COMPUTER-READABLE RECORDING MEDIUM TO RECORD PROGRAM FOR MAKING COMPUTER EXECUTE CONTROL METHOD

TECHNICAL FIELD

This invention relates to traveling control of a hybrid vehicle provided with an internal combustion engine and an electric motor for vehicle traveling.

BACKGROUND ART

In recent years, a hybrid vehicle draws public attention as an eco-friendly vehicle. The hybrid vehicle is a vehicle provided with a power storage device, an inverter and an electric motor driven by the inverter as a power source for vehicle traveling in addition to a conventional internal combustion engine.

With regard to such a hybrid vehicle, there is a known hybrid vehicle capable of traveling by switching between a first traveling mode for traveling while stopping the internal combustion engine and a second traveling mode for traveling while operating the internal combustion engine in accordance with a vehicle state.

For example, Japanese Patent Laying-open No. 2005-146910 discloses a hybrid vehicle in which switching from a first traveling mode to a second traveling mode is prohibited until warming of a catalyst for purifying exhaust gas of an engine is completed and switching to the second traveling mode is permitted after the catalyst is heated up to a predetermined temperature.

However, in the hybrid vehicle disclosed in Japanese Patent Laying-open No. 2005-146910, the traveling mode is switched without consideration to a temperature of a fuel supplying system. Therefore, as described below, corrosion of a fuel pipe, that is, dry corrosion may be generated.

The dry corrosion is a phenomenon where aluminum is corroded by alcohol containing fuel. Particularly, under the environment of a high temperature and a low water concentration, oxidation corrosion of aluminum is radically developed. In a case where at least a part of the fuel pipe is made of aluminum, and when a traveling time in the first traveling mode is long, it is not possible to obtain a cooling effect of the fuel pipe by fuel supplied from a fuel tank to the fuel pipe. Therefore, due to influences such as solar radiation and an atmosphere around the engine, the temperature of the fuel pipe is increased so as to generate the dry corrosion.

Particularly, in a plug-in hybrid vehicle capable of charging the power storage device from a power source outside the vehicle (system power supply), a traveling distance with only electric power stored from the power source outside the vehicle into the power storage device is extended and the traveling time in the first traveling mode for traveling while stopping the internal combustion engine is long. Therefore, suppressing the generation of the dry corrosion is an important problem.

DISCLOSURE OF THE INVENTION

This invention is achieved in order to solve the problem, and an object thereof is to provide a hybrid vehicle capable of suppressing generation of dry corrosion in a fuel pipe.

Another object of this invention is to provide a control method for a hybrid vehicle capable of suppressing generation of dry corrosion in a fuel pipe and a computer-readable recording medium to record a program for making a computer execute the control method.

According to this invention, a hybrid vehicle is provided with a power storage device, an electric motor, an internal combustion engine, a fuel pipe, a first temperature estimating unit and a traveling mode control unit. The power storage device stores electric power for vehicle traveling. The electric motor receives electric supply from the power storage device and generates traveling drive force. At least a part of the fuel pipe is made of aluminum and the fuel pipe is for supplying fuel from a fuel tank to the internal combustion engine. The first temperature estimating unit estimates a temperature of the fuel pipe. The traveling mode control unit controls switching of a traveling mode including a first mode (EV mode) for traveling while stopping the internal combustion engine and a second mode (HV mode) for traveling while operating the internal combustion engine. The traveling mode control unit switches the traveling mode from the first mode to the second mode when the temperature of the fuel pipe estimated by the first temperature estimating unit is not less than a first prescribed value at the time of traveling in the first mode.

Preferably, the hybrid vehicle is further provided with a second temperature estimating unit. The second temperature estimating unit estimates a temperature of the fuel. The traveling mode control unit further sets the traveling mode to be the first mode when the temperature of the fuel estimated by the second temperature estimating unit is not less than a second prescribed value.

Further preferably, the hybrid vehicle is further provided with a charging state estimating unit. The charging state estimating unit estimates a state amount (SOC) showing a charging state of the power storage device. The traveling mode control unit further sets the traveling mode to be the second mode when the state amount (SOC) is less than a third prescribed value.

Preferably, the hybrid vehicle is further provided with an alcohol concentration detection device and a water concentration detection device. The alcohol concentration detection device is configured to detect a concentration of alcohol contained in the fuel. The water concentration detection device is configured to detect a water concentration contained in the fuel. The traveling mode control unit switches the traveling mode from the first mode to the second mode only when the alcohol concentration detected by the alcohol concentration detection device and the water concentration detected by the water concentration detection device satisfy a predetermined condition.

Preferably, the hybrid vehicle is further provided with a power generation device and a charging device. The power generation device is configured to generate the electric power with motion energy generated by the internal combustion engine and charge the power storage device. The charging device is configured to receive electric supply from a power source outside the vehicle and charge the power storage device.

According to this invention, the control method is a control method for a hybrid vehicle. The hybrid vehicle is provided with a power storage device, an electric motor, an internal combustion engine and a first temperature estimating unit. The power storage device stores electric power for vehicle traveling. The electric motor receives electric supply from the power storage device and generates traveling drive force. At least a part of a fuel pipe is made of aluminum and the fuel pipe is for supplying fuel from a fuel tank to the internal combustion engine. The first temperature estimating unit estimates a temperature of the fuel pipe. The control method includes the steps of determining whether or not the vehicle travels in a first mode (EV mode) for traveling while stopping the internal combustion engine, determining whether or not the temperature of the fuel pipe estimated by the first temperature estimating unit is not less than a first prescribed value, and switching the traveling mode from the first mode to a second mode (HV mode) for traveling while operating the internal combustion engine when it is determined that the temperature of the fuel pipe is not less than the first prescribed value at the time of traveling in the first mode.

Preferably, the hybrid vehicle is further provided with a second temperature estimating unit. The second temperature estimating unit estimates a temperature of the fuel. The control method further includes the steps of determining whether or not the temperature of the fuel estimated by the second temperature estimating unit is not less than a second prescribed value, and setting the traveling mode to be the first mode when the temperature of the fuel is not less than the second prescribed value.

Further preferably, the hybrid vehicle further includes the steps of estimating a state amount (SOC) showing a charging state of the power storage device, determining whether or not the state amount (SOC) is less than a third prescribed value, and setting the traveling mode to be the second mode when it is determined that the state amount (SOC) is less than a third prescribed value.

Preferably, the hybrid vehicle is further provided with an alcohol concentration detection device and a water concentration detection device. The alcohol concentration detection device is configured to detect a concentration of alcohol contained in the fuel. The water concentration detection device is configured to detect a water concentration contained in the fuel. The control method further includes the step of determining whether or not the alcohol concentration detected by the alcohol concentration detection device and the water concentration detected by the water concentration detection device satisfy a predetermined condition. In the step of switching the traveling mode from the first mode to the second mode, the traveling mode is switched only when it is further determined that the alcohol concentration and the water concentration satisfy the predetermined condition.

According to this invention, the recording medium is a computer-readable recording medium to record a program for making a computer execute any of the control methods described above.

In this invention, when the temperature of the fuel pipe is not less than the first prescribed value at the time of traveling in the first mode (EV mode), the traveling mode is switched from the first mode to the second mode (HV mode). Therefore, the fuel is supplied from the fuel tank to the fuel pipe by operating the internal combustion engine, and the fuel pipe is cooled by the supplied fuel.

Consequently, according to this invention, a temperature rise of the fuel pipe is suppressed. As a result, it is possible to suppress generation of dry corrosion.

BRIEF DESCRIPTION OF THE DRAWINGS

FIG. 10 is a flowchart for illustrating control of a traveling mode by a traveling mode control unit shown in FIG. 9.

BEST MODES FOR CARRYING OUT THE INVENTION

Figure 1:
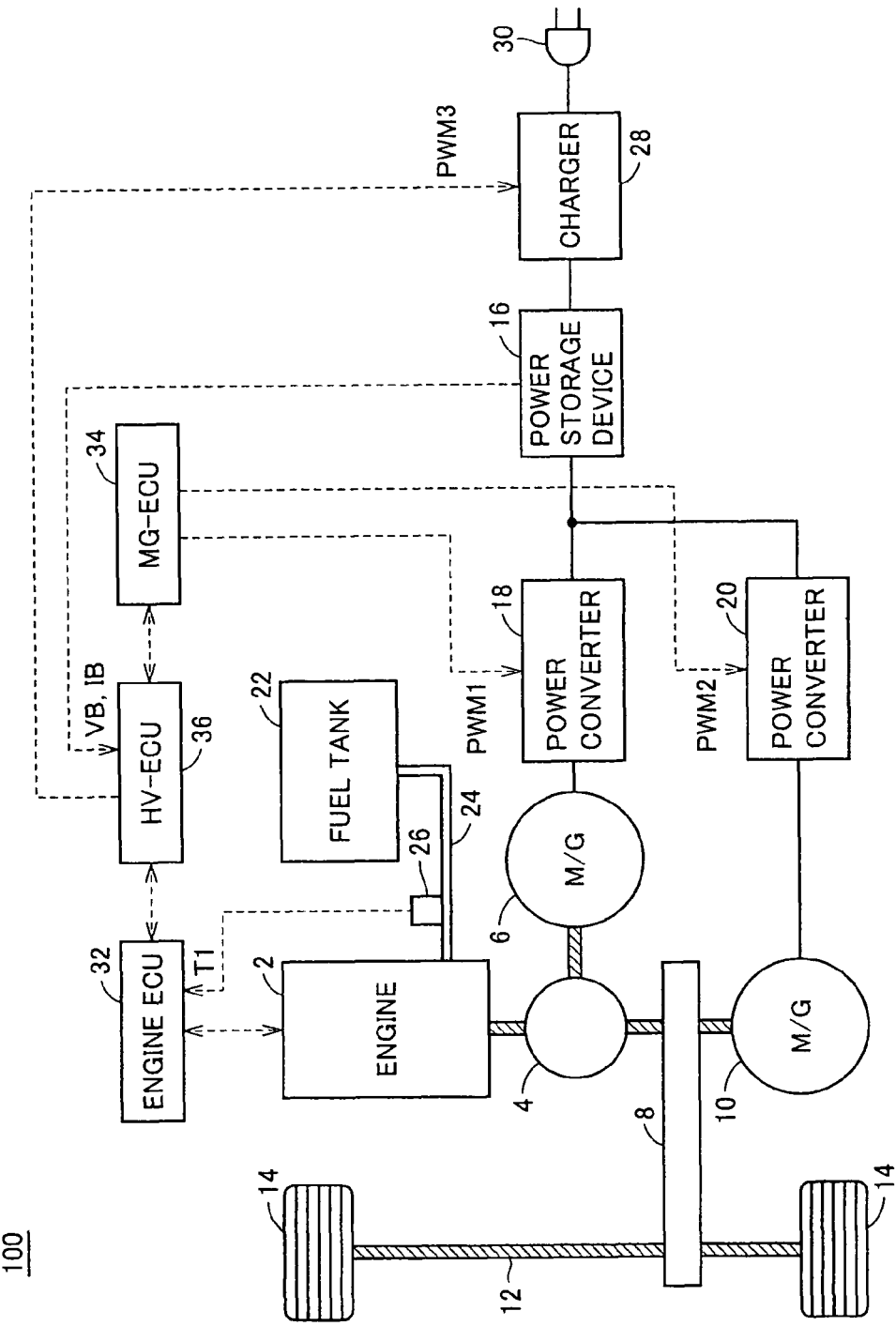
FIG. 1 is an entire block diagram of a hybrid vehicle according to a first embodiment of this invention.

Hereinafter, embodiments of the present invention will be described in detail with reference to the drawings. It should be noted that the same parts or corresponding parts in the drawings are given the same reference numerals and a description of the parts will not be repeated.

First Embodiment

FIG. 1 is an entire block diagram of a hybrid vehicle according to a first embodiment of this invention. With reference to FIG. 1, a hybrid vehicle 100 is provided with an engine 2, a power split device 4, motor generators 6 and 10, a reducer 8, a drive shaft 12 and wheels 14. Hybrid vehicle 100 is further provided with a power storage device 16, power converters 18 and 20, a fuel tank 22, a fuel pipe 24, a temperature sensor 26, a charger 28, a charging plug 30, an engine ECU (Electronic Control Unit) 32, a MG-ECU 34 and a HV-ECU 36.

Power split device 4 is combined with engine 2, motor generator 6 and reducer 8 so as to split mechanical power between the above elements. For example, a planetary gear having three rotation shafts of a sun gear, a planetary carrier and a ring gear can be used as power split device 4. The three rotation shafts are connected to rotation shafts of engine 2 and motor generator 6 and an input shaft of reducer 8 respectively. A rotation shaft of motor generator 10 is coupled to the input shaft of reducer 8. That is, motor generator 10 and reducer 8 have the same rotation shaft, and the rotation shaft is connected to the ring gear of power split device 4.

Motion energy generated by engine 2 is split into motor generator 6 and reducer 8 by power split device 4. That is, engine 2 is assembled in hybrid vehicle 100 as power source for driving drive shaft 12 and motor generator 6. Motor generator 6 is assembled in hybrid vehicle 100 so as to be operated as a power generator driven by engine 2 and also as an electric motor capable of starting up engine 2. Motor generator 10 is assembled in hybrid vehicle 100 as a power source for driving drive shaft 12.

Power storage device 16 is a DC power source capable of being charged and discharged for storing electric power for vehicle traveling, and for example made of a nickel hydride secondary battery, a lithium ion secondary battery or the like. Power storage device 16 supplies the electric power to power converters 18 and 20. Power storage device 16 receives the electric power from power converter 18 and/or 20 so as to be charged when generating the electric power in motor generator 6 and/or 10. Further, power storage device 16 receives the electric power from charger 28 so as to be charged when charged from a power source outside the vehicle (not shown) connected to charging plug 30 (hereinafter, referred to as the "outside power source"). It should be noted that a high capacity capacitor can be adapted as power storage device 16. Any electric buffer capable of temporarily storing the electric power generated by motor generators 6 and 10 and the electric power from the outside power source and supplying the stored electric power to motor generators 6 and 10 can be adapted. It should be noted that voltage VB of power storage device 16 and an electric current LB inputted to and outputted from power storage device 16 are detected by a sensor (not shown). Detected values thereof are outputted to HV-ECU 36.

Power converter 18 converts the electric power generated by motor generator 6 into DC electric power based on a signal PWM1 from MG-ECU 34, and outputs the power to power storage device 16. Power converter 20 converts the DC electric power supplied from power storage device 16 into AC electric power based on a signal PWM2 from MG-ECU 34, and outputs the power to motor generator 10. It should be noted that power converter 18 converts the DC electric power supplied from power storage device 16 into the AC electric power based on signal PWM1 at the time of starting up engine 2, and outputs the power to motor generator 6. Power converter 20 converts the electric power generated by motor generator 10 into the DC electric power based on signal PWM2 at the time of braking the vehicle or reducing an accelerated rate on a down sloping surface, and outputs the power to power storage device 16. It should be noted that electric converter 18, 20 is formed by a three phase PWM (Pulse Width Modulation) inverter including switching elements for three phases.

Motor generator 6, 10 is an AC electric motor and for example formed by a three phase AC synchronous electric motor with a permanent magnet buried in a rotor. Motor generator 6 converts the motion energy generated by engine 2 into electric energy, and outputs the energy to power converter 18. Motor generator 6 generates drive force by three phase AC electric power received from power converter 18, and starts up engine 2.

Motor generator 10 generates drive torque of the vehicle by the three phase AC electric power received from power converter 20. Motor generator 10 converts dynamic energy stored in the vehicle as the motion energy or potential energy into the electric energy and outputs the energy to power converter 20 at the time of braking the vehicle or reducing the accelerated rate on the down sloping surface.

Engine 2 receives supply of fuel from fuel tank 22 via fuel pipe 24. Engine 2 converts thermal energy generated by combustion of the fuel into the motion energy of a motion element such as a piston and the rotor, and outputs the converted motion energy to power split device 4. For example, when the motion element is the piston and motion thereof is reciprocal motion, the reciprocal motion is converted into rotational motion via a so-called crank mechanism and the motion energy of the piston is transmitted to power split device 4.

Fuel tank 22 stores the fuel supplied from the outside of the vehicle. Fuel pipe 24 is a pipe for supplying the fuel from fuel tank 22 to engine 2, and formed by a fuel supply pipe connected to the fuel tank, a delivery pipe for supplying the fuel supplied from the fuel supply pipe to a fuel injection device of engine 2 and the like. At least a part of this fuel pipe 24 is made of aluminum. For example, the delivery pipe is formed by aluminum. It should be noted that the entire fuel pipe 24 may be made of aluminum.

Temperature sensor 26 detects a temperature T1 of fuel pipe 24, and outputs a detected value thereof to engine ECU 32. As an example, temperature sensor 26 is installed in an outer surface of the delivery pipe forming fuel pipe 24.

Charging plug 30 is an outside charging interface for receiving the electric power for charging power storage device 16 from the outside power source. Charger 28 converts the electric power given from the outside power source to charging plug 30 into a voltage level of power storage device 16, and outputs the power to power storage device 16 based on a signal PWM3 from HV-ECU 36.

Engine ECU 32 controls engine 2 based on an action order from HV-ECU 36. Engine ECU 32 receives the detected value of temperature T1 of fuel pipe 24 from temperature sensor 26, and outputs the detected value to HV-ECU 36.

MG-ECU 34 receives torque command values of motor generators 6 and 10 and the detected value of voltage VB of power storage device 16 from HV-ECU 36. Based on the received torque command values and the detected value of voltage VB and motor electric currents and motor rotational angles of motor generators 6 and 10, MG-ECU 34 generates signals PWM1 and PWM2 for driving motor generators 6 and 10 respectively, and outputs generated signals PWM1 and PWM2 to power converters 18 and 20 respectively. It should be noted that the motor electric currents and the motor rotational angles of the motor generators are detected by a sensor (not shown).

HV-ECU 36 generates various command values required for controlling drive of motor generators 6 and 10 and engine 2 based on a vehicle state such as an accelerator pedal position, vehicle speed and a shift position, and outputs the generated command values to MG-ECU 34 and engine ECU 32.

HV-ECU 36 controls a traveling mode of hybrid vehicle 100. That is, HV-ECU 36 controls switching between a traveling mode for traveling while stopping engine 2 and using only motor generator 10 (an electric motor traveling mode) and a traveling mode for traveling while operating engine 2 (a hybrid traveling mode) (hereinafter, the electric motor traveling mode is referred to as an "EV mode" and the hybrid traveling mode is referred to as a "HV mode").

Here, HV-ECU 36 estimates a charging state of power storage device 16 (hereinafter, referred to as a "SOC (State of Charge)" represented by 0 to 100% relative to a fully charged state) based on voltage VB of power storage device 16 and electric current IB, and controls the switching of the traveling mode based on the estimated SOC. Further, HV-ECU 36 receives the detected value of temperature T1 of the fuel pipe detected by temperature sensor 26 from engine ECU 32, and controls the traveling mode based on the received detected value of temperature T1 in accordance with a control structure described later.

HV-ECU 36 generates signal PWM3 for driving charger 28 at the time of charging power storage device 16 from the outside power source connected to charging plug 30, and outputs generated signal PWM3 to charger 28.

Figure 2:
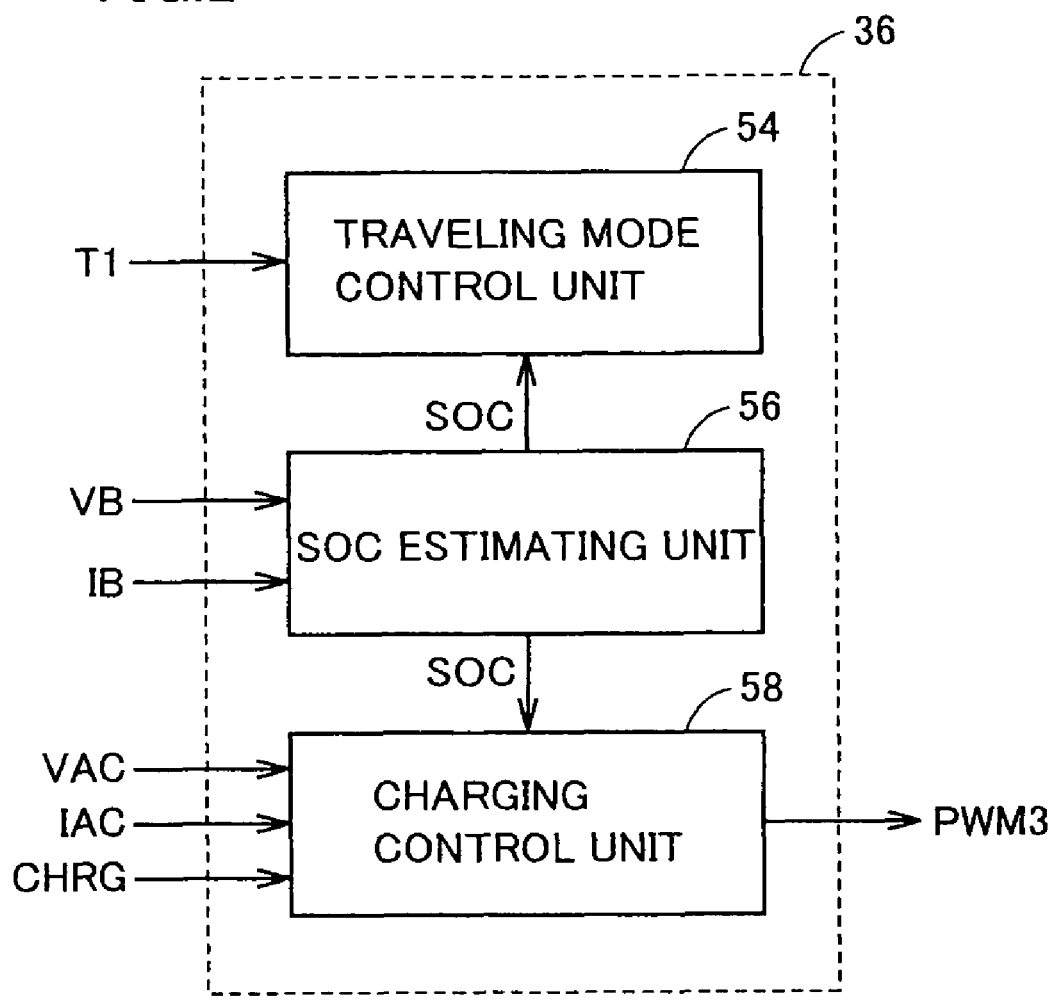
FIG. 2 is a functional block diagram of a HV-ECU shown in FIG. 1.

FIG. 2 is a functional block diagram of HV-ECU 36 shown in FIG. 1. With reference to FIG. 2, HV-ECU 36 includes a traveling mode control unit 54, a SOC estimating unit 56 and a charging control unit 58.

Traveling mode control unit 54 controls the switching of the traveling mode based on a signal SOC from SOC estimating unit 56 showing the SOC of power storage device 16 and the detected value of temperature T1 of fuel pipe 24 detected by temperature sensor 26. As an example, when the SOC of power storage device 16 is higher than a prescribed threshold value (for example set to be 20 to 30%), traveling mode control unit 54 sets the traveling mode to be the EV mode. When the SOC of power storage device 16 reaches the threshold value, traveling mode control unit 54 sets the traveling mode to be the HV mode so as to maintain the SOC in the vicinity of the threshold value (that is, engine 2 is started up).

Here, traveling mode control unit 54 inhibits traveling in the EV mode regardless of the SOC, when temperature T1 of fuel pipe 24 is increased to not less than the prescribed threshold value showing that a temperature of fuel pipe 24 is high. That is, at the time of traveling in the EV mode, engine 2 is started up and the traveling mode is switched to the HV mode.

When the temperature of fuel pipe 24 is high, the traveling mode is forcibly switched to the HV mode regardless of the SOC. This is to suppress generation of dry corrosion in fuel pipe 24. That is, at least a part of fuel pipe 24 (such as the delivery pipe) is made of aluminum. Therefore, in a case where alcohol containing fuel is used as the fuel, and when a temperature of the part is high, the dry corrosion is generated. Particularly, in hybrid vehicle 100 according to the first embodiment, power storage device 16 can be charged from the outside power source with charger 28 and long-distance traveling in the EV mode can be performed with the electric power supplemented from the outside power source. Therefore, by stopping engine 2 for a long time, it is not possible to obtain a cooling effect of fuel pipe 24 by fuel supply to fuel pipe 24, and hence the temperature of fuel pipe 24 may be high due to influences of solar radiation or an atmosphere around engine 2. Thus, in the first embodiment, in a case where temperature T1 of fuel pipe 24 exceeds a temperature of possibly generating the dry corrosion, the traveling mode is forcibly switched to the HV mode so as to operate engine 2 and cool fuel pipe 24 by the fuel supplied from fuel tank 22 to fuel pipe 24 in accordance with the operation of engine 2.

It should be noted that even at the time of traveling in the EV mode, when a driver largely presses down on an accelerator pedal, when an air conditioner of an engine driven type is operated, or when the engine is warmed, an action of engine 2 is permitted. That is, at the time of traveling in the EV mode, engine 2 is not started up unless required for the drive force. Basically, the charged electric power of power storage device 16 is consumed in motor generator 10 so as to make the vehicle travel.

SOC estimating unit 56 estimates the SOC of power storage device 16 based on the detected values of voltage VB of power storage device 16 and electric current IB, and outputs signal SOC showing the estimated SOC to traveling mode control unit 54. It should be noted that various known methods can be used as an estimating method for the SOC.

When a signal CHRG for requiring charging of power storage device 16 by charger 28 is activated, charging control unit 58 generates signal PWM3 for driving charger 28 based on detected values of voltage VAC and an electric current IAC of the electric power inputted from charging plug 30, and outputs the signal to charger 28. It should be noted that voltage VAC and electric current IAC are detected by a sensor (not shown).

Figure 3:
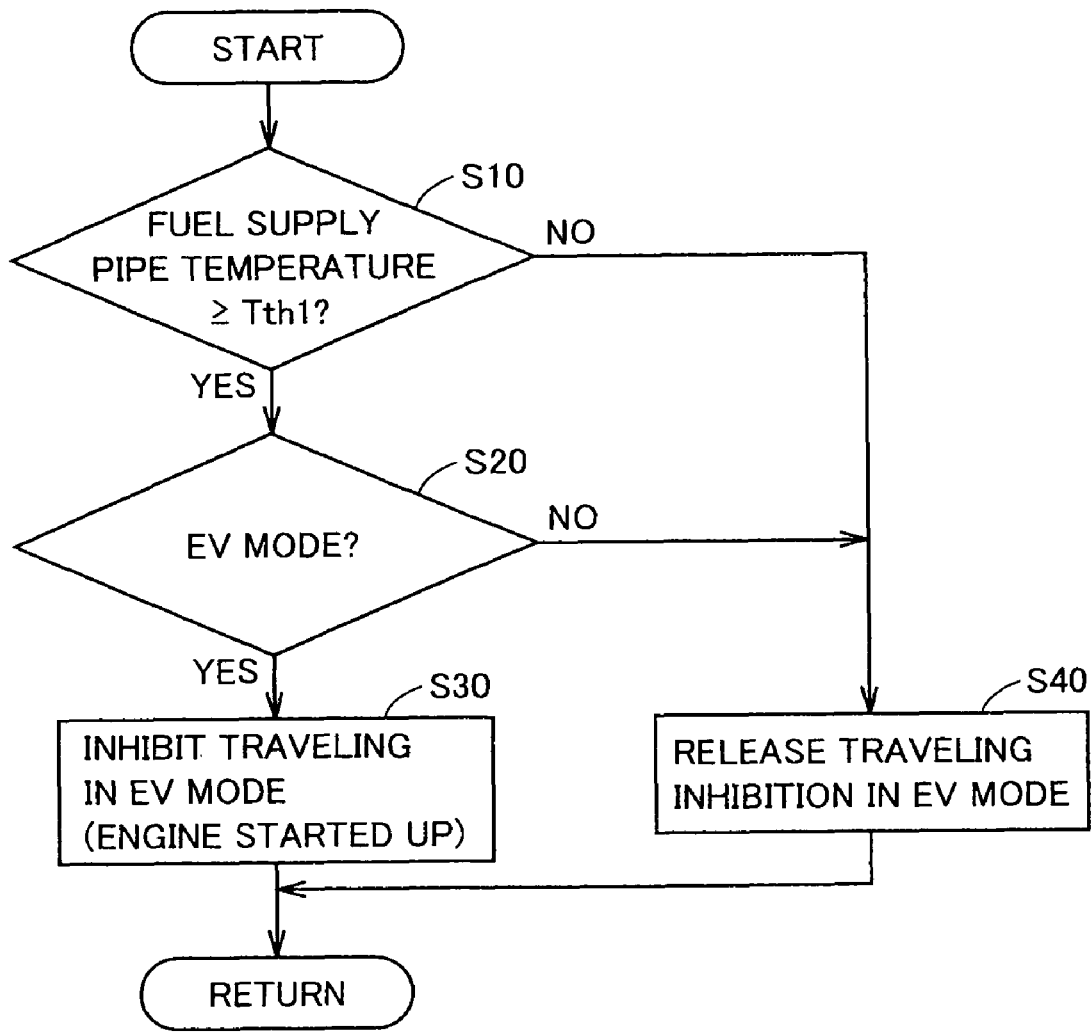
FIG. 3 is a flowchart for illustrating control of a traveling mode based on a temperature of a fuel pipe.

FIG. 3 is a flowchart for illustrating control of a traveling mode based on temperature T1 of fuel pipe 24. It should be noted that processing of this flowchart is called from a main routine and executed when the vehicle is capable of traveling (for example, when a vehicle system is running), at a fixed interval or at every time when a predetermined condition is satisfied.

With reference to FIG. 3, traveling mode control unit 54 determines whether or not temperature T1 of fuel pipe 24 is not less than a prescribed threshold value Tth1 (Step S10). It should be noted that this threshold value Tth1 is preliminarily set based on a predetermined temperature of possibly generating the dry corrosion in fuel pipe 24.

When it is determined that temperature T1 is not less than threshold value Tth1 (YES in Step S10), traveling mode control unit 54 determines whether or not a current traveling mode is the EV mode (Step S20).

When it is determined that the traveling mode is the EV mode (YES in Step S20), traveling mode control unit 54 inhibits the traveling in the EV mode (Step S30). That is, traveling mode control unit 54 starts up engine 2 and switches the traveling mode to the HV mode. Thereby, the fuel is supplied from fuel tank 22 to fuel pipe 24 in accordance with the action of engine 2 and fuel pipe 24 is cooled by the supplied fuel.

Meanwhile, in a case where it is determined that temperature T1 of fuel pipe 24 is lower than threshold value Tth1 in Step S10 (NO in Step S10), or in a case where it is determined that the traveling mode is not the EV mode (that is, the HV mode) in Step S20 (NO in Step S20), traveling mode control unit 54 releases traveling inhibition in the EV mode (Step S40). Therefore, in this case, the traveling mode is controlled based on the SOC of power storage device 16.

It should be noted that temperature T1 of fuel pipe 24 is detected by temperature sensor 26 installed in fuel pipe 24 in the above description. However, temperature T1 of fuel pipe 24 may be estimated based on a temperature of cooling water of engine 2, an outside air temperature around the vehicle, a temperature in an engine room, a temperature of the fuel, fuel consumption or the like.

As mentioned above, in the first embodiment, when temperature T1 of fuel pipe 24 is high at the time of traveling in the EV mode, the traveling mode is switched from the EV mode to the HV mode. Therefore, the fuel is supplied from fuel tank 22 to fuel pipe 24 by operating engine 2, and fuel pipe 24 is cooled by the supplied fuel. Consequently, according to the first embodiment, the temperature rise of fuel pipe 24 is suppressed. As a result, it is possible to suppress the generation of the dry corrosion.

Second Embodiment

Figure 4:
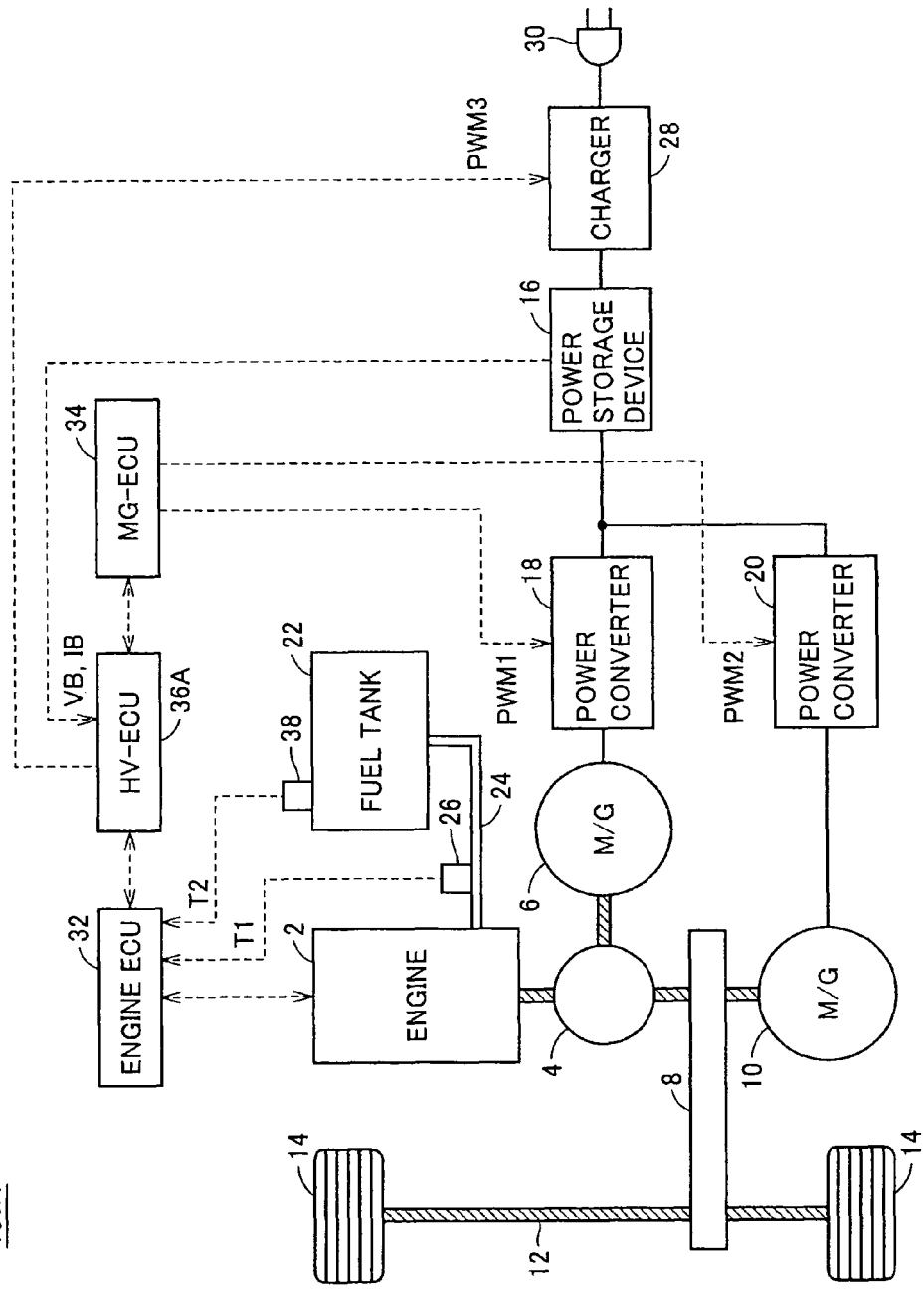
FIG. 4 is an entire block diagram of a hybrid vehicle according to a second embodiment.

FIG. 4 is an entire block diagram of a hybrid vehicle according to a second embodiment. With reference to FIG. 4, a hybrid vehicle 100A is further provided with a temperature sensor 38 in a configuration of hybrid vehicle 100 in the first embodiment shown in FIG. 1, and also a HV-ECU 36A instead of HV-ECU 36.

Temperature sensor 38 detects a temperature T2 of the fuel, and outputs a detected value thereof to engine ECU 32. As an example, temperature sensor 38 is installed in fuel tank 22 so as to detect the temperature of the fuel in fuel tank 22.

HV-ECU 36A estimates the SOC of power storage device 16, and controls the switching of the traveling mode based on the estimated SOC. Here, HV-ECU 36A receives detected values of temperature T1 of the fuel pipe detected by temperature sensor 26 and temperature T2 of the fuel detected by temperature sensor 38 from engine ECU 32, and controls the traveling mode based on the received detected values of temperatures T1 and T2 in accordance with a control structure described later.

It should be noted that other functions of HV-ECU 36A are the same as HV-ECU 36 in the first embodiment. Other configurations of hybrid vehicle 100A are the same as hybrid vehicle 100 according to the first embodiment.

Figure 5:
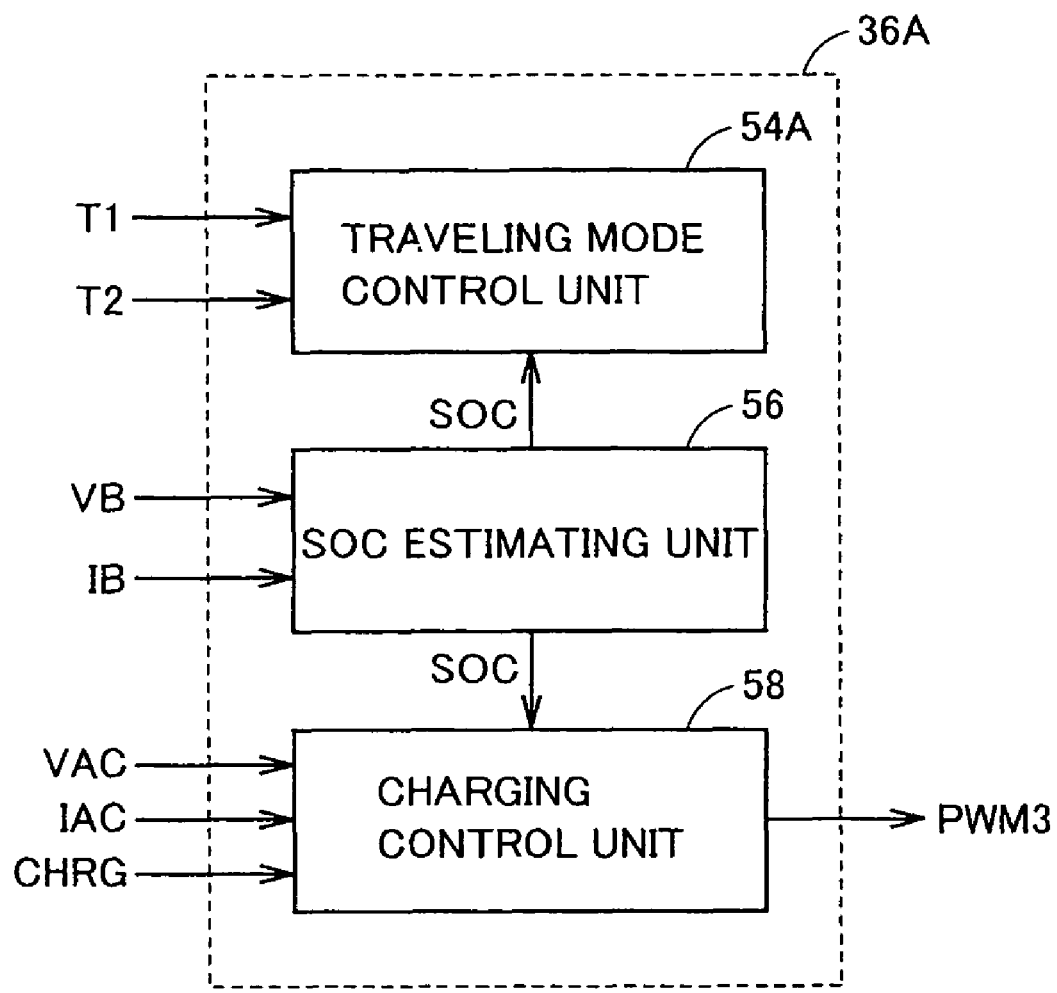
FIG. 5 is a functional block diagram of a HV-ECU shown in FIG. 4.

FIG. 5 is a functional block diagram of HV-ECU 36A shown in FIG. 4. With reference to FIG. 5, HV-ECU 36A includes a traveling mode control unit 54A instead of traveling mode control unit 54 in a configuration of HV-ECU 36 in the first embodiment shown in FIG. 2.

As well as traveling mode control unit 54 in the first embodiment, when the SOC of power storage device 16 is higher than the prescribed threshold value (for example set to be 20 to 30%), traveling mode control unit 54A sets the traveling mode to be the EV mode. When the SOC reaches the threshold value, the traveling mode is set to be the HV mode.

Here, in a case where temperature T1 of fuel pipe 24 is increased to not less than threshold value Tth1 showing that the temperature of fuel pipe 24 is high, and when temperature T2 of the fuel is lower than a prescribed threshold value, traveling mode control unit 54A inhibits the traveling in the EV mode regardless of the SOC in order to suppress the generation of the dry corrosion. That is, at the time of traveling in the EV mode, engine 2 is started up and the traveling mode is switched to the HV mode.

Meanwhile, in the case where temperature T1 of fuel pipe 24 is increased to not less than threshold value Tth1, but when temperature T2 of the fuel is high, it is not possible to expect the cooling effect of fuel pipe 24 by the fuel supplied from fuel tank 22 to fuel pipe 24. Conversely, the generation of the dry corrosion is facilitated by supplying the high-temperature fuel to fuel pipe 24. Therefore, traveling mode control unit 54A maintains the traveling mode to be the EV mode. However, in a case where the SOC of power storage device 16 is decreased, power storage device 16 is over-discharged possibly hindering the traveling of the vehicle. Thus, traveling mode control unit 54A sets the traveling mode to be the HV mode.

It should be noted that even at the time of traveling in the EV mode, the action of engine 2 is permitted in a case where the driver largely presses down on the accelerator pedal as well as the first embodiment. Other configurations of HV-ECU 36A are the same as HV-ECU 36 in the first embodiment.

Figure 6:
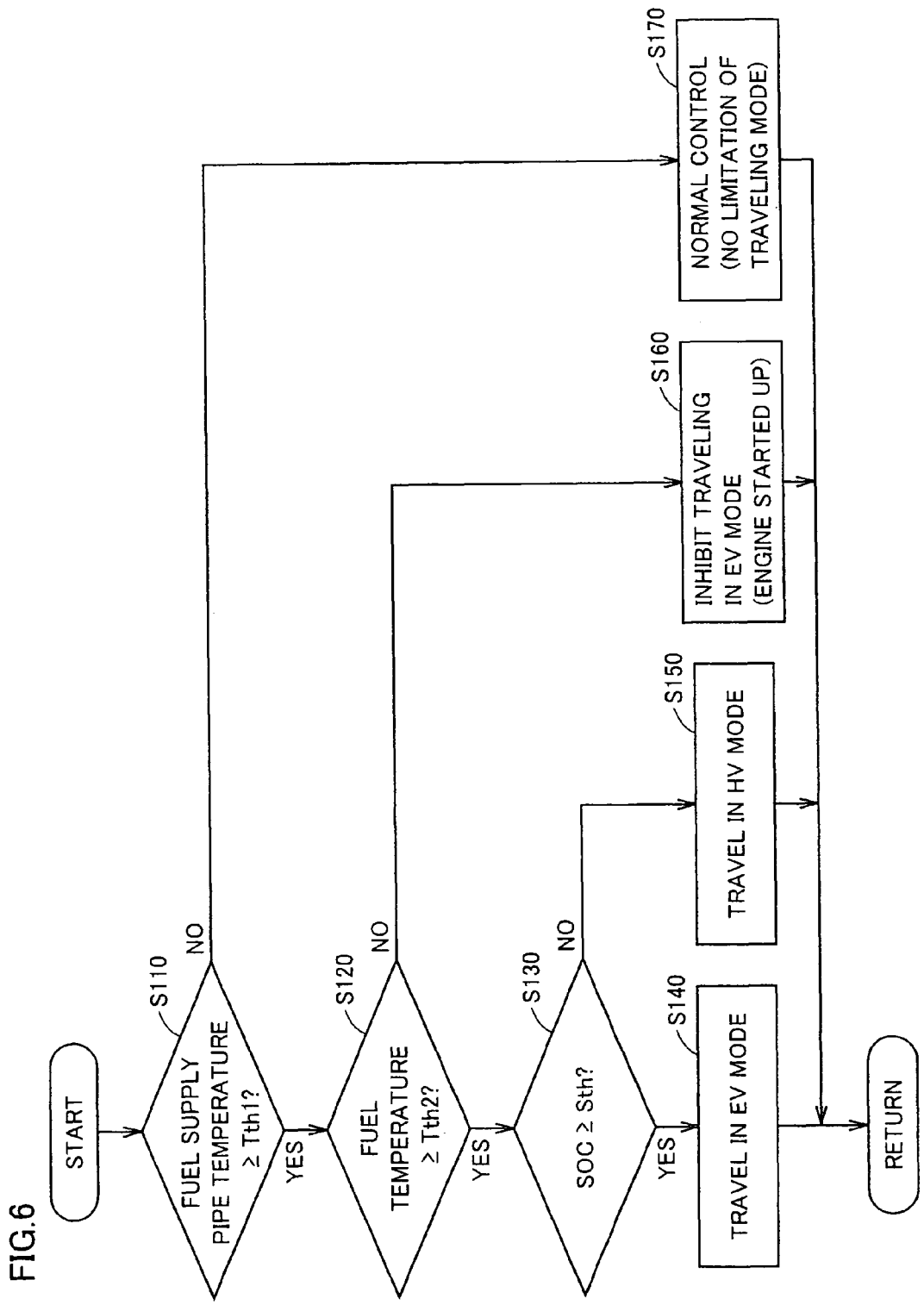
FIG. 6 is a flowchart for illustrating control of a traveling mode by a traveling mode control unit shown in FIG. 5.

FIG. 6 is a flowchart for illustrating control of a traveling mode by traveling mode control unit 54A shown in FIG. 5. It should be noted that processing of this flowchart is also called from the main routine and executed when the vehicle is capable of traveling (for example, when the vehicle system is running), at the fixed interval or at every time when the predetermined condition is satisfied.

With reference to FIG. 6, traveling mode control unit 54A determines whether or not temperature T1 of fuel pipe 24 is not less than threshold value Tth1 (Step S110). When it is determined that temperature T1 is lower than threshold value Tth1 (NO in Step S110), traveling mode control unit 54A does not limit the traveling mode based on temperatures T1 and T2 but performs normal control of switching the traveling mode based on the SOC of power storage device 16.

When it is determined that temperature T1 of fuel pipe 24 is not less than threshold value Tth1 in Step S110 (YES in Step S110), traveling mode control unit 54A determines whether or not temperature T2 of the fuel is not less than a prescribed threshold value Tth2 (Step S120). It should be noted that this threshold value Tth2 is preliminarily set based on a predetermined temperature of possibly generating the dry corrosion in fuel pipe 24. Threshold value Tth2 may be the same value as threshold value Tth1 or a different value.

When it is determined that temperature T2 is lower than threshold value Tth2 (NO in Step S120), traveling mode control unit 54A inhibits the traveling in the EV mode (Step S160). That is, traveling mode control unit 54A starts up engine 2 and switches the traveling mode to be the HV mode. Thereby, the fuel is supplied from fuel tank 22 to fuel pipe 24 in accordance with the action of engine 2 and fuel pipe 24 is cooled by the supplied fuel.

When it is determined that temperature T2 of the fuel is not less than threshold value Tth2 in Step S120 (YES in Step S120), traveling mode control unit 54A determines whether or not the SOC of power storage device 16 is not less than a prescribed threshold value Sth (Step S130). It should be noted that this threshold value Sth is set to be a predetermined SOC value of not causing over-discharge of power storage device 16.

When it is determined that the SOC is not less than threshold value Sth (YES in Step S130), traveling mode control unit 54A sets the traveling mode to be the EV mode (Step S140). Thereby, the high-temperature fuel is not supplied to fuel pipe 24. Meanwhile, when it is determined that the SOC is lower than threshold value Sth (NO in Step S130), traveling mode control unit 54A sets the traveling mode to be the HV mode (Step S150). Thereby, the over-discharge of power storage device 16 is prevented.

It should be noted that although temperature T2 of the fuel is detected by temperature sensor 38 in the above description, temperature T2 of the fuel may be estimated based on the temperature of the cooling water of engine 2, the outside air temperature around the vehicle, a temperature of a catalyst provided in an exhaust system, the vehicle speed or the like.

As mentioned above, in the second embodiment, the switching of the traveling mode is controlled in consideration to not only temperature T1 of fuel pipe 24 but also temperature T2 of the fuel and the SOC of power storage device 16. Therefore, according to the second embodiment, while concerning the over-discharge of power storage device 16, it is possible to more surely suppress the generation of the dry corrosion.

Modified Example

In the second embodiment, the traveling mode is controlled based on temperature T1 of fuel pipe 24 and temperature T2 of the fuel. However, as a simpler configuration, the traveling mode may be controlled based on temperature T2 of the fuel. That is, while the traveling mode is controlled based on temperature T1 of fuel pipe 24 in the first embodiment, the traveling mode is controlled based on temperature T2 of the fuel in this modified example.

Figure 7:
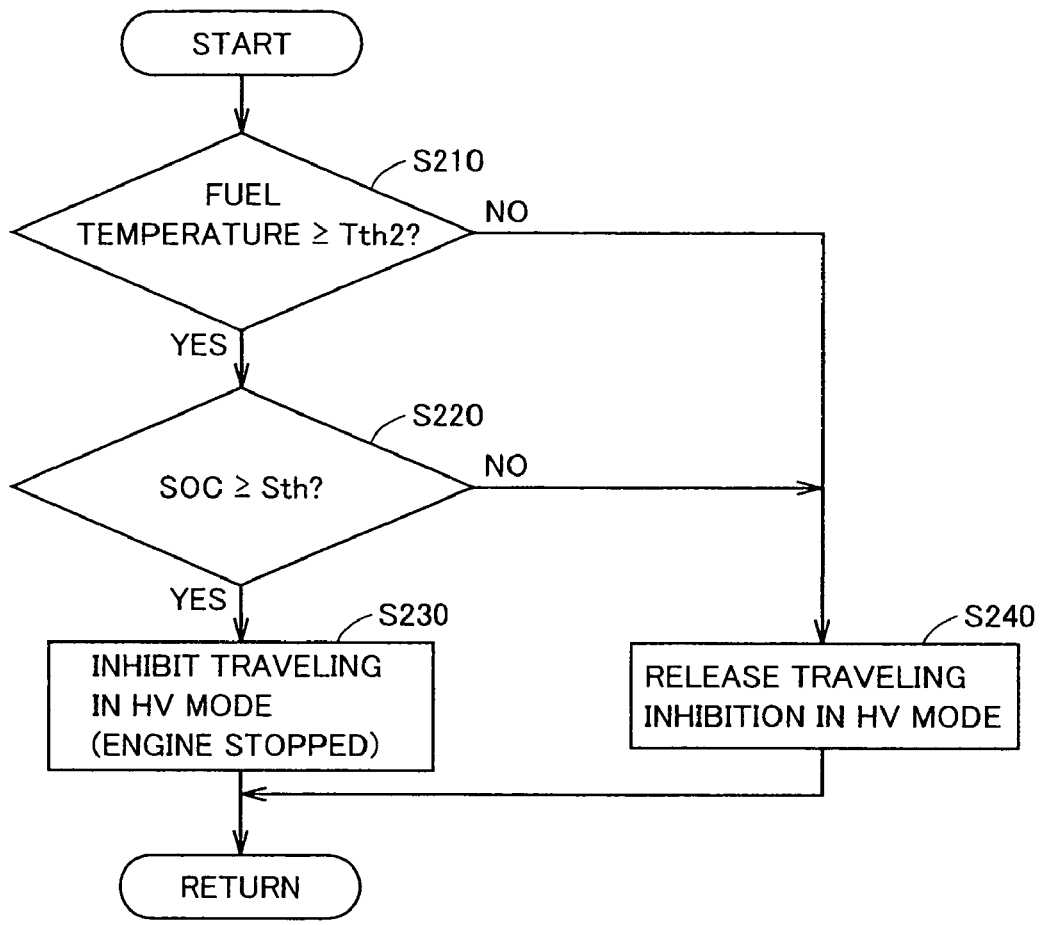
FIG. 7 is a flowchart for illustrating control of a traveling mode in a modified example.

FIG. 7 is a flowchart for illustrating control of a traveling mode in this modified example. It should be noted that processing of this flowchart is also called from the main routine and executed when the vehicle is capable of traveling (for example, when the vehicle system is running), at the fixed interval or at every time when the predetermined condition is satisfied.

With reference to FIG. 7, a traveling mode control unit in this modified example determines whether or not temperature T2 of the fuel is not less than threshold value Tth2 (Step S210). When it is determined that temperature T2 is not less than threshold value Tth2 (YES in Step S210), the traveling mode control unit determines whether or not the SOC of power storage device 16 is not less than threshold value Sth (Step S220).

When it is determined that the SOC is not less than threshold value Sth (YES in Step S220), the traveling mode control unit inhibits the traveling in the HV mode (Step S230). That is, the traveling mode control unit stops engine 2 and sets the traveling mode to be the EV mode. Thereby, the high-temperature fuel is not supplied to fuel pipe 24 and the generation of the dry corrosion is suppressed.

Meanwhile, in a case where it is determined that temperature T2 of the fuel is lower than threshold value Tth2 in Step S210 (NO in Step S210), or in a case where it is determined that the SOC is lower than threshold value Sth in Step S220 (NO in Step S220), the traveling mode control unit releases traveling inhibition in the HV mode (Step S240). Thereby, the over-discharge of power storage device 16 is prevented.

According to this modified example, with the simpler configuration than the second embodiment, it is possible to suppress the generation of the dry corrosion while concerning the over-discharge of power storage device 16.

Third Embodiment

In a third embodiment, in order to more precisely detect a generation condition of the dry corrosion, an alcohol concentration and a water concentration in the fuel are detected in addition to temperature T1 of fuel pipe 24. The traveling mode is controlled based on detected values thereof.

Figure 8:
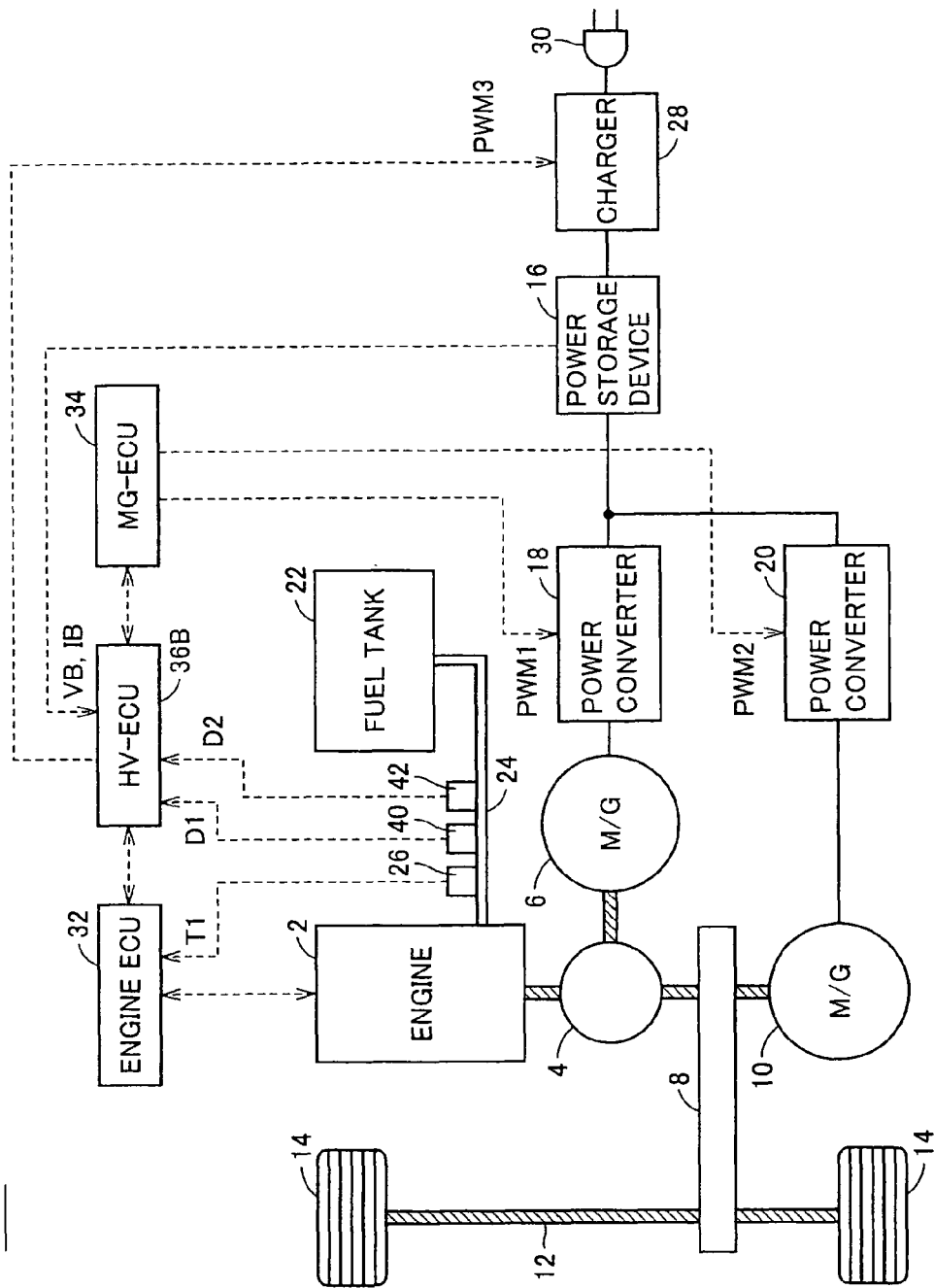
FIG. 8 is an entire block diagram of a hybrid vehicle according to a third embodiment.

FIG. 8 is an entire block diagram of a hybrid vehicle according to the third embodiment. With reference to FIG. 8, a hybrid vehicle 100B is further provided with an alcohol concentration sensor 40 and a water concentration sensor 42 in the configuration of hybrid vehicle 100 in the first embodiment shown in FIG. 1, and also a HV-ECU 36B instead of HV-ECU 36.

Alcohol concentration sensor 40 detects an alcohol concentration D1 contained in the fuel, and outputs a detected value thereof to HV-ECU 36B. It should be noted that a known sensor such as an electric type and an optical type can be used as alcohol concentration sensor 40. Water concentration sensor 42 detects a water concentration D2 contained in the fuel, and outputs a detected value thereof to HV-ECU 36B. It should be noted that various known sensors can be used as water concentration sensor 42 as well.

It should be noted that in FIG. 8, a case where alcohol concentration sensor 40 and water concentration sensor 42 are installed in fuel pipe 24 is shown as an example. However, at least one of alcohol concentration sensor 40 and water concentration sensor 42 may be installed in fuel tank 22.

HV-ECU 36B estimates the SOC of power storage device 16, and controls the switching of the traveling mode based on the estimated SOC. Here, HV-ECU 36B controls the traveling mode based on detected values of temperature T1 of fuel pipe 24 from temperature sensor 26, alcohol concentration D1 from alcohol concentration sensor 40, and water concentration D2 from water concentration sensor 42 in accordance with a control structure described later.

It should be noted that other functions of HV-ECU 36B are the same as HV-ECU 36 in the first embodiment. Other configurations of hybrid vehicle 100B are the same as hybrid vehicle 100 according to the first embodiment.

Figure 9:
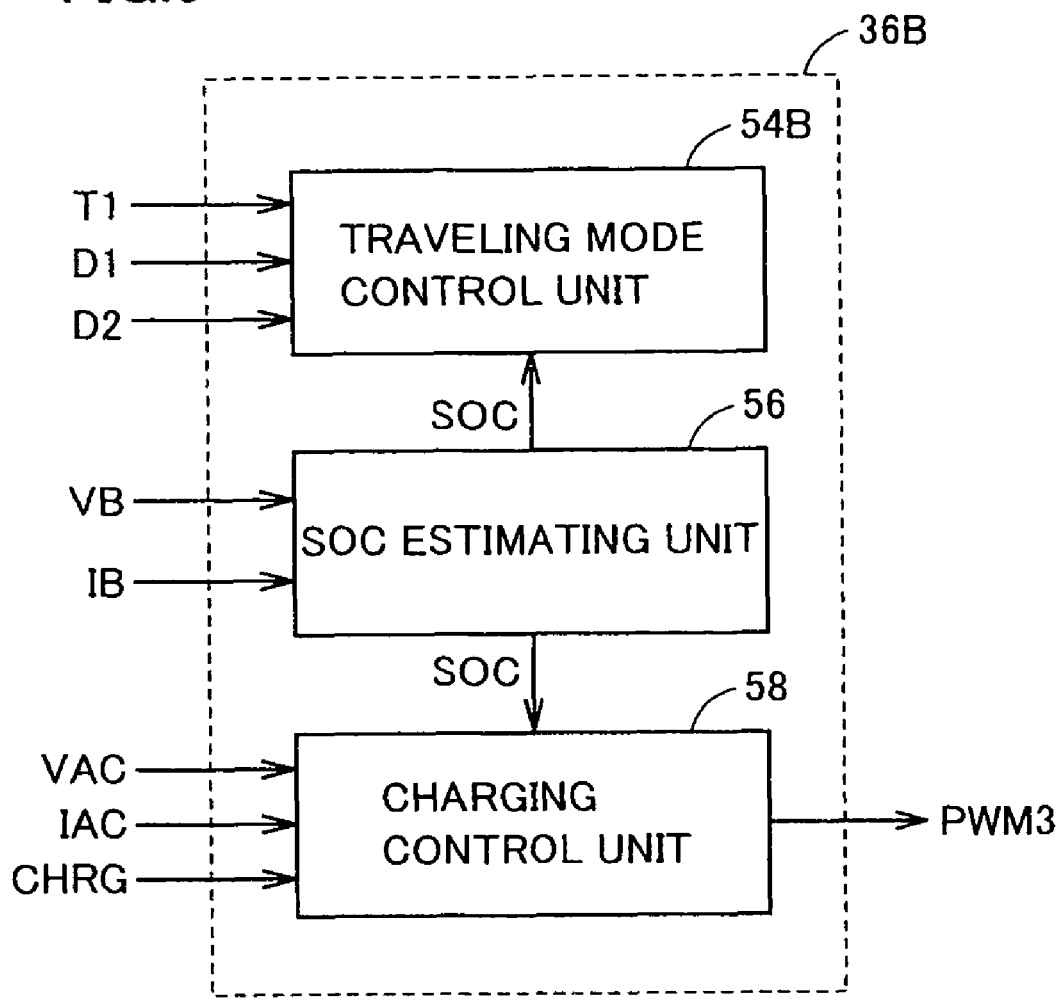
FIG. 9 is a functional block diagram of a HV-ECU shown in FIG. 8.

FIG. 9 is a functional block diagram of HV-ECU 36B shown in FIG. 8. With reference to FIG. 9, HV-ECU 36B includes a traveling mode control unit 54B instead of traveling mode control unit 54 in the configuration of HV-ECU 36 in the first embodiment shown in FIG. 2.

As well as traveling mode control unit 54 in the first embodiment, when the SOC of power storage device 16 is higher than the prescribed threshold value (for example set to be 20 to 30%), traveling mode control unit 54B sets the traveling mode to be the EV mode. When the SOC reaches the threshold value, the traveling mode is set to be the HV mode.

Here, in a case where temperature T1 of fuel pipe 24 is not less than threshold value Tth1, and further in a case where alcohol concentration D1 is not less than a prescribed threshold value and water concentration D2 is not more than a prescribed threshold value, traveling mode control unit 54B inhibits the traveling in the EV mode regardless of the SOC. That is, at the time of traveling in the EV mode, engine 2 is started up and the traveling mode is switched to the HV mode.

The dry corrosion is easily generated under the environment that a high concentration of alcohol is contained in the fuel with a high temperature and a low water concentration. Therefore, in the third embodiment, when such a condition is satisfied, it is understood that the dry corrosion is generated. Thus, engine 2 is started up and the traveling mode is switched to the HV mode. In other words, in a case where temperature T1 of fuel pipe 24 is high but alcohol concentration D1 in the fuel is low, or the water concentration is not low, it is understood that a possibility of generating the dry corrosion is low. Thus, the traveling mode is not forcibly switched to the HV mode. Thereby, it is possible to prevent that engine 2 is unnecessarily driven so as to deteriorate fuel efficiency.

It should be noted that even at the time of traveling in the EV mode, the action of engine 2 is permitted in the case where the driver largely presses down on the accelerator pedal as well as the first embodiment. Other configurations of HV-ECU 36B are the same as HV-ECU 36 in the first embodiment.

FIG. 10 is a flowchart for illustrating control of the traveling mode by traveling mode control unit 54B shown in FIG. 9. It should be noted that processing of this flowchart is also called from the main routine and executed when the vehicle is capable of traveling (for example, when the vehicle system is running), at the fixed interval or at every time when the predetermined condition is satisfied.

With reference to FIG. 10, this flowchart further includes Steps S12 and S14 in the flowchart shown in FIG. 3. That is, when it is determined that temperature T1 of fuel pipe 24 is not less than threshold value Tth1 in Step S10 (YES in Step S10), traveling mode control unit 54B determines whether or not alcohol concentration D1 in the fuel is not less than a prescribed threshold value Dth1 (Step S12). It should be noted that this threshold value Dth1 is preliminarily set based on a predetermined alcohol concentration of possibly generating the dry corrosion.

When it is determined that alcohol concentration D1 is not less than threshold value Dth1 (YES in Step S12), traveling mode control unit 54B determines whether or not water concentration D2 in the fuel is not more than a prescribed threshold value Dth2 (Step S14). It should be noted that this threshold value Dth2 is preliminarily set based on a predetermined water concentration of possibly generating the dry corrosion. When it is determined that water concentration D2 is not more than threshold value Dth2 (YES in Step S14), traveling mode control unit 54B brings the processing to Step S20.

Meanwhile, in a case where it is determined that alcohol concentration D1 is lower than threshold value Dth1 in Step S12 (NO in Step S12), or in a case where it is determined that water concentration D2 is more than threshold value Dth2 in Step S14 (NO in Step S14), traveling mode control unit 54B brings the processing to Step S40 and the traveling inhibition in the EV mode is released.

As mentioned above, in the third embodiment, the switching of the traveling mode is controlled in consideration to not only temperature T1 of fuel pipe 24 but also alcohol concentration D1 and water concentration D2 in the fuel. Therefore, according to the third embodiment, it is possible to suppress the generation of the dry corrosion and further prevent that engine 2 is unnecessarily driven so as to deteriorate the fuel efficiency.

It should be noted that although power storage device 16 is charged from the outside power source by dedicated charger 28 in the above embodiments, a method of charging power storage device 16 from the outside power source is not limited to such a method. For example, an electric line pair connected to charging plug 30 may be connected to neutral points of motor generators 6 and 10 and the electric power from the outside power source given from charging plug 30 to the neutral points of motor generators 6 and 10 may be converted by power converters 18 and 20 so as to charge power storage device 16.

A series/parallel type hybrid vehicle capable of dividing and transmitting the mechanical power of engine 2 into reducer 8 and motor generator 6 by power split device 4 is described in the above embodiments. However, this invention can be applied to other type of hybrid vehicle. That is, for example, this invention can be applied to a series type hybrid vehicle of using engine 2 only for driving motor generator 6 and generating the drive force of the vehicle only by motor generator 10, a hybrid vehicle of collecting only regenerative energy among the motion energy generated by engine 2 as the electric energy, a motor-assisting hybrid vehicle taking the engine as major mechanical power with assistance of the motor according to need, and the like.

It should be noted that in the above configurations, the control in HV-ECUs 36, 36A and 36B is performed by a CPU (Central Processing Unit) in fact. The CPU reads out a program provided with the steps of the flowcharts described in the embodiments from a ROM (Read Only Memory), and executes the read program so as to execute the processing in accordance with the flowcharts. Therefore, the ROM corresponds to a computer (CPU)-readable recording medium to record the program provided with the steps of the flowcharts described in the embodiments.

It should be noted that in the above configurations, motor generator 10 corresponds to an "electric motor" in this invention, and engine 2 corresponds to an "internal combustion engine" in this invention. Temperature sensor 26 corresponds to a "first temperature estimating unit" in this invention, and temperature sensor 38 corresponds to a "second temperature estimating unit" in this invention.

Further, alcohol concentration sensor 40 corresponds to an "alcohol concentration detection device" in this invention, and water concentration sensor 42 corresponds to a "water concentration detection device" in this invention. Moreover, motor generator 6 and power converter 18 form a "power generation device" in this invention, and charger 28 and charging plug 30 form a "charging device" in this invention.

The embodiments disclosed herein should be regarded as not limitation but an example in all aspects. A scope of the present invention is not shown by the above description but claims. The present invention should include all variations within similar meanings and ranges to the claims.

The invention claimed is:

1. A hybrid vehicle comprising:
   a power storage device for storing electric power for vehicle traveling;
   an electric motor for receiving electric supply from said power storage device and generating traveling drive force;
   an internal combustion engine;
   a fuel pipe for supplying fuel from a fuel tank to said internal combustion engine, at least a part of the fuel pipe being made of aluminum;
   a first temperature estimating unit for estimating a temperature of said fuel pipe; and
   a traveling mode control unit for controlling switching of a traveling mode including a first mode for traveling while stopping said internal combustion engine and a second mode for traveling while operating said internal combustion engine, wherein
   said traveling mode control unit switches said traveling mode from said first mode to said second mode when the temperature of said fuel pipe estimated by said first temperature estimating unit is not less than a first prescribed value at the time of traveling in said first mode.

2. The hybrid vehicle according to claim 1, further comprising:
   a second temperature estimating unit for estimating a temperature of said fuel, wherein
   said traveling mode control unit further sets said traveling mode to be said first mode when the temperature of said fuel estimated by said second temperature estimating unit is not less than a second prescribed value.

3. The hybrid vehicle according to claim 2, further comprising:
   a charging state estimating unit for estimating a state amount showing a charging state of said power storage device, wherein
   said traveling mode control unit further sets said traveling mode to be said second mode when said state amount is less than a third prescribed value.

4. The hybrid vehicle according to claim 1, further comprising:
   an alcohol concentration detection device configured to detect a concentration of alcohol contained in said fuel; and
   a water concentration detection device configured to detect a water concentration contained in said fuel, wherein
   said traveling mode control unit switches said traveling mode from said first mode to said second mode only when the alcohol concentration detected by said alcohol concentration detection device and the water concentration detected by the water concentration detection device satisfy a predetermined condition.

5. The hybrid vehicle according to claim 1, further comprising:
   a power generation device configured to generate the electric power with motion energy generated by said internal combustion engine and charge said power storage device; and
   a charging device configured to receive electric supply from a power source outside the vehicle and charge said power storage device.

6. A control method for a hybrid vehicle, said hybrid vehicle comprising:
   a power storage device for storing electric power for vehicle traveling;
   an electric motor for receiving electric supply from said power storage device and generating traveling drive force;
   an internal combustion engine;
   a fuel pipe for supplying fuel from a fuel tank to said internal combustion engine, at least a part of the fuel pipe being made of aluminum; and
   a first temperature estimating unit for estimating a temperature of said fuel pipe, and
   said control method including the steps of:
   determining whether or not the vehicle travels in a first mode for traveling while stopping said internal combustion engine;
   determining whether or not the temperature of said fuel pipe estimated by said first temperature estimating unit is not less than a first prescribed value; and
   switching the traveling mode from said first mode to a second mode for traveling while operating said internal combustion engine when it is determined that the temperature of said fuel pipe is not less than said first prescribed value at the time of traveling in said first mode.

7. The control method for the hybrid vehicle according to claim 6, said hybrid vehicle further comprising:

a second temperature estimating unit for estimating a temperature of said fuel, and said control method further including the steps of:

determining whether or not the temperature of said fuel estimated by said second temperature estimating unit is not less than a second prescribed value; and setting said traveling mode to be said first mode when the temperature of said fuel is not less than the second prescribed value.

8. The control method for the hybrid vehicle according to claim 7, further including the steps of:

estimating a state amount showing a charging state of said power storage device;

determining whether or not said state amount is less than a third prescribed value; and setting said traveling mode to be said second mode when it is determined that said state amount is less than said third prescribed value.

9. The control method for the hybrid vehicle according to claim 6, said hybrid vehicle further comprising:

an alcohol concentration detection device configured to detect a concentration of alcohol contained in said fuel; and a water concentration detection device configured to detect a water concentration contained in said fuel, and the control method further including the step of:

determining whether or not the alcohol concentration detected by said alcohol concentration detection device and the water concentration detected by the water concentration detection device satisfy a predetermined condition, wherein in the step of switching said traveling mode from said first mode to said second mode, said traveling mode is switched only when it is further determined that said alcohol concentration and said water concentration satisfy said predetermined condition.

10. A computer-readable recording medium to record a program for making a computer execute the control method according to claim 6.

* * * * *